Oct. 18, 1938.  E. G. STAUDE  2,133,726
SHEET FEEDER
Filed Oct. 22, 1934  8 Sheets-Sheet 2

INVENTOR
EDWIN G. STAUDE
BY Paul Paul Moore
ATTORNEYS

Patented Oct. 18, 1938

2,133,726

UNITED STATES PATENT OFFICE 2,133,726

SHEET FEEDER

Edwin G. Staude, Minneapolis, Minn.

Application October 22, 1934, Serial No. 749,439

30 Claims. (Cl. 271—39)

This invention relates to improvements in sheet feeders and has among its objects to provide a mechanism for automatically feeding paper blanks of various sizes and shapes, and particularly for feeding envelope blanks which are finely lithographed, and in which the partially dried ink frequently causes the blanks to adhere to one another. This object is accomplished by providing blank separating means which acts to buckle and slide the blanks away from one another, thus overcoming the adherent action of ink which may have been offset on an adjacent blank, whereby the feed wheel will feed the blanks without skipping.

Another object is to provide a movable feed bed or hopper comprising a conveyor upon which the blanks rest, which conveyor shall be automatically advanced for carrying the sheets to a feed wheel which successively advances the foremost blanks.

Another object is to provide a blank-supplying conveyor capable of receiving a very substantial supply of blanks at one time, thus making frequent loading unnecessary, and giving the operator plenty of time between loading operations to attend to other duties, including the removal of finished work from the delivery end of the machine.

Another object is to provide a "feeler" or throw-out lever which shall stop the movement of the conveyor in the hopper directly that the stack of blanks has reached the proper contacting angle against the feed wheel.

Another object is to provide a single or double jogging mechanism for lining up blanks having an irregular outline similar to the blanks of an open end envelope.

Another object of my invention is to provide a construction whereby the "feeler" or controlling lever may pass inside the periphery of the feed wheel so as to get an extremely sensitive contact as close as possible to the forward edge of the blank and thus control the thickness of the stack of blanks more accurately.

Another object is to provide a specially constructed "feeler" or control lever which shall also act as a "separator" of blanks that are slightly stuck one to another.

A further object is to provide a feeding mechanism which may be quickly adjusted from one size blank to another and in which a substantial stack of blanks may be placed in the hopper at one time.

Other objects of my invention will appear from the description of the drawings forming a part of this application and in said drawings

Figure 1:
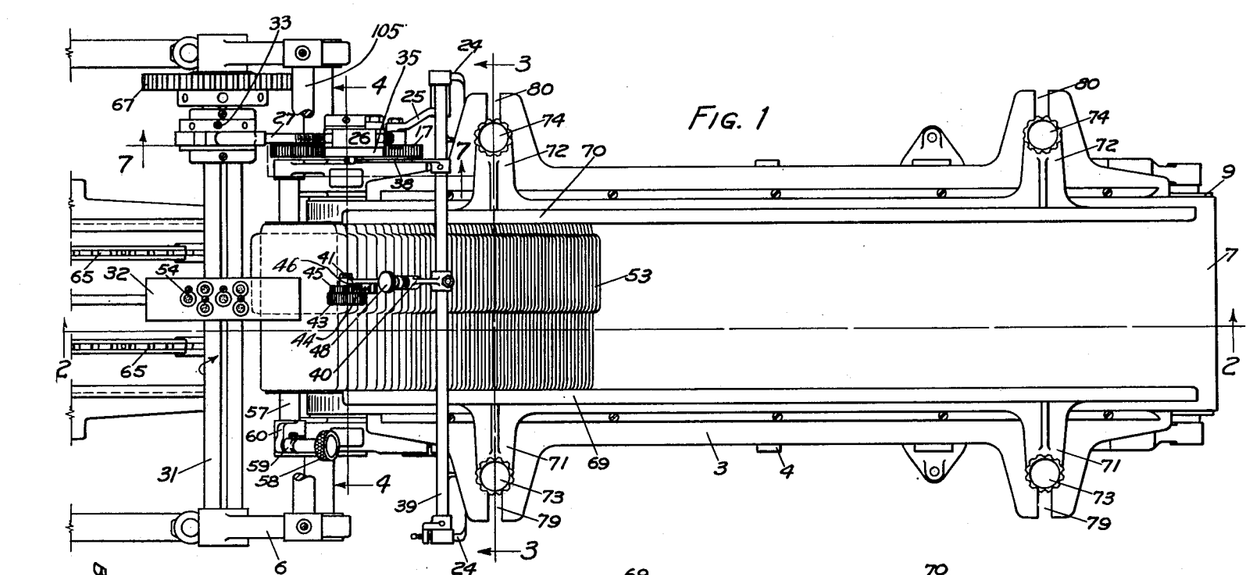
Figure 1 is a plan view of one form of feeding mechanism embodying my invention.
Figures 2, 4, 5:
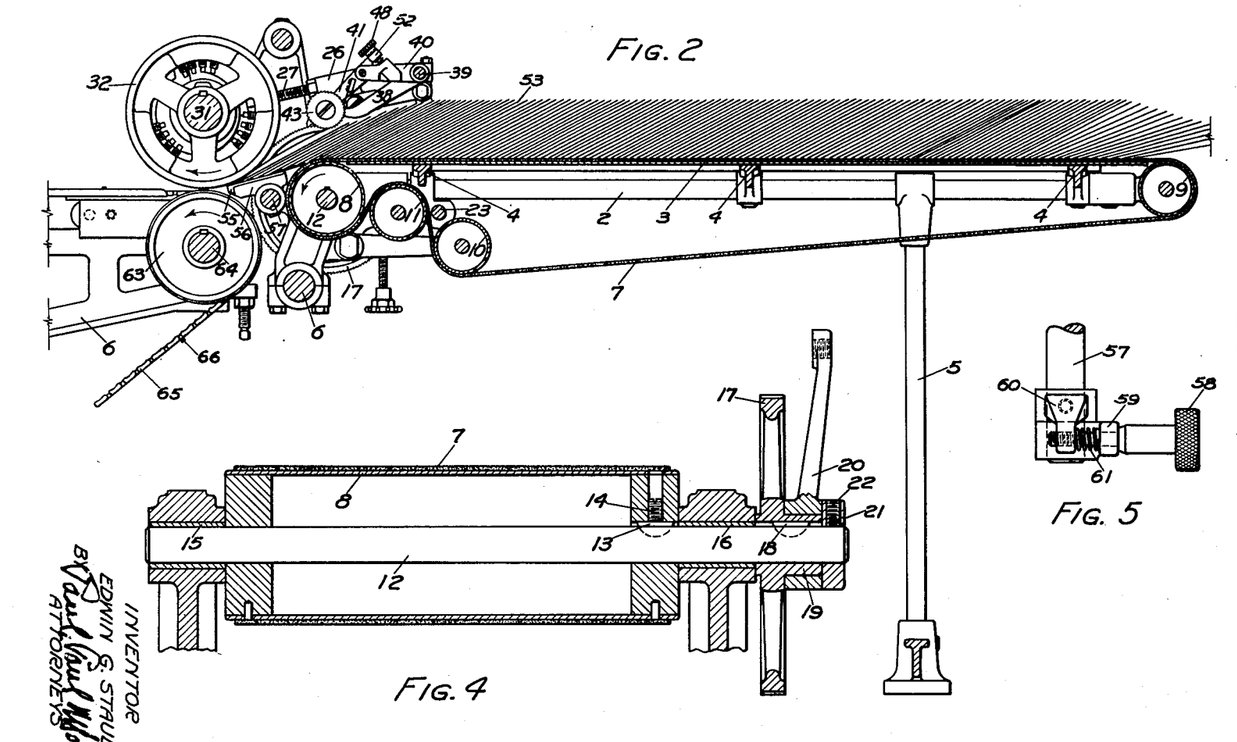
Figure 2 is a vertical longitudinal section on the line 2—2 of Figure 1, looking in the direction of the arrow.
Figure 4 is a detail cross-section on the line 4—4 of Figure 1 showing part of the drive means for the conveyor.
Figure 5 is a detail of the adjustment of the rock-shaft which controls the retard member to adjust the space between said retard member and feed wheel.

Referring to Figures 1 and 2: Numeral 2 indicates the framework of the feeder which supports, by means of cross-members 4, a table or plate 3. The framework is supported at one end by standards 5, and at the opposite end on a cross-shaft which forms part of a folding and gluing machine, generally indicated at 6. Supported on the plate 3 is the upper run of a wide canvas belt 7, as one example of a sheet supply moving means. The belt passes over the drive pulley 8 arranged near the sheet feeder, and over an idler 9 at the opposite end. A suitable belt-tightener is provided and includes a roll 10 and an idler 11. The drive pulley 8 is mounted on a shaft 12 (see Figure 4) and is secured to the same by Woodruff key 13 held in position by small set screw 14. The shaft 12 is mounted in bearings 15 and 16 and is driven by a ratchet wheel 17 secured thereto by Woodruff key 18. The ratchet wheel 17 has a hub 19 on which an arm 20 is mounted for oscillation. A collar 21 holds the arm against translative movement, the collar being secured to the shaft by set screw 22.

Figure 6:
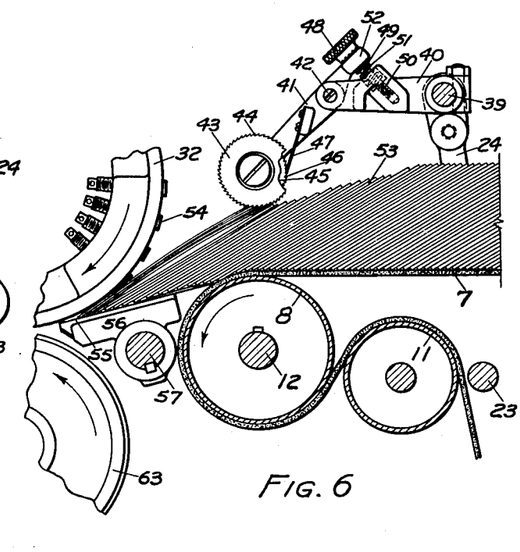
Figure 6 is a detail longitudinal section of the feeder corresponding to Figure 2 and showing the action of the sheet separating mechanism.
Figure 7:
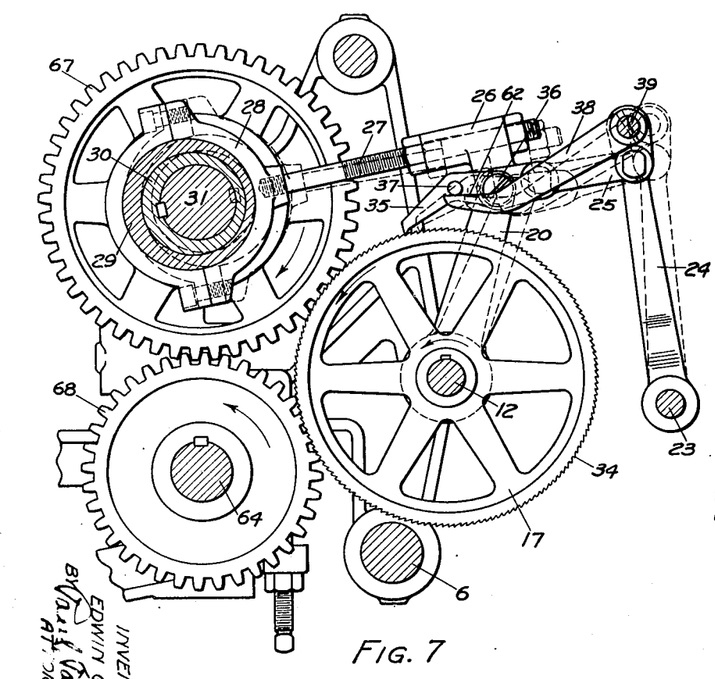
Figure 7 is an enlarged section of the driving means on the line 7—7 of Figure 1.
Figure 8:
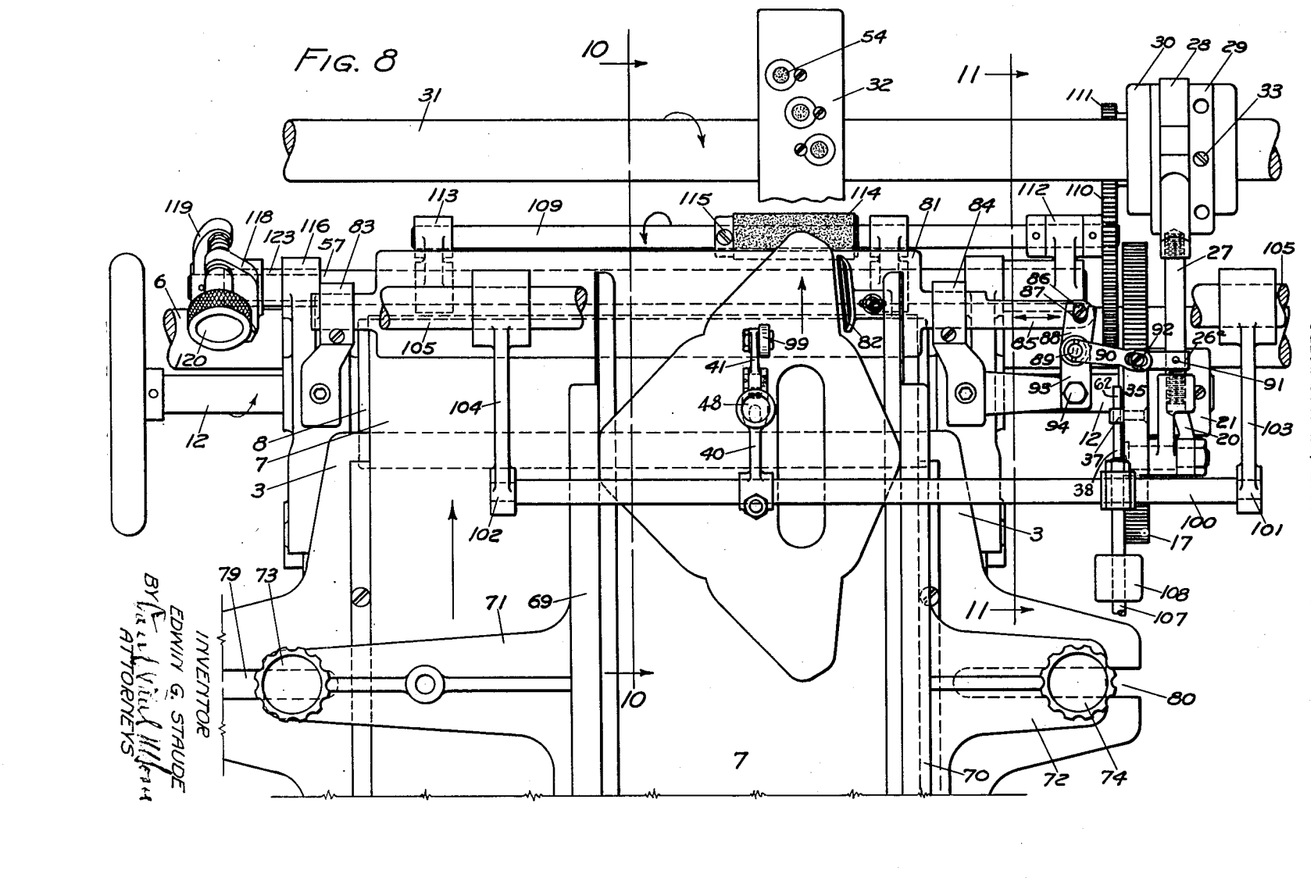
Figure 8 is an enlarged plan of a portion of Figure 1, but including a jogging mechanism for lining up irregular shaped blanks, and also showing a rotating retard member for the feeding mechanism.

Referring to Figures 1, 6 and 7: Mounted on a shaft 23 is a rocker arm 24. This rocker arm is pivotally connected by link 25 to a sleeve member 26 which, in turn, is adjustably secured to a threaded rod 27. This rod is in turn connected with an eccentric strap 28 operated by eccentric 29. The eccentric 29 is, in turn, connected to an eccentric 30 which is keyed to a shaft 31 to which the feed wheel 32 is splined. By relatively adjusting the two eccentrics, a variable throw of the arm 20 may be obtained. Suitable set screws 33 (see Figures 1 and 8) are adapted to clamp the eccentric 29 to the eccentric 30, after adjustment to obtain the required throw.

Teeth 34 of the ratchet wheel 17 are engaged by a pawl 35, which is pivoted as at 36 on the arm 20. The pivot 36 also acts as a pivot for the link 25. The pawl 35 has a pin 37 (see Figures 7 and 9) adapted to be engaged and moved by a throw-out finger 38 to disengage the pawl and stop the advancing motion of the belt 7. This finger is pinned to a shaft 39 which connects the arms 24 secured one on each side of the feed hopper and oscillatable on the rock shaft 23. A reciprocating motion is given to the arms 24 and shaft 39 by means of the link 25, which, as before stated, is connected to the member 26 which, in turn, reciprocates the pawl arm 20 through the connecting pivot 36. The finger 38 is normally reciprocated in such manner as not to raise the pin and disengage the pawl. As long as the finger does not move the pawl upwardly from the position shown in Figure 7, for example, the pawl moves the wheel in direction of the arrow as a result of the action of the eccentric members 28 and 29, connecting rod 27 and the member 26.

The pawl throw-out finger 38 is controlled by variations in the packed condition of supply of sheets or blanks, to vary the speed of the supply advancing means, or belt 7, in a manner to prevent jamming at the feed throat. In this instance, the belt is intermittently started and stopped respectively when packing sufficiently decreases and when packing is unduly increased. I will now describe one means by which this new function can be accomplished, it being understood that I do not wish to be limited by the exact construction, and that variation in speed of supply advance need not necessarily be obtained by stopping the belt or equivalent advancing means.

Referring to Figures 1, 2 and 6, there is mounted on the swinging shaft 39, an arm 40. The arm has thereon a lever member 41 pivoted as at 42. Pivoted on the end of the lever 41 is a ratchet wheel having ratchet teeth 44 cut at such an angle that as the shaft 39 moves in direction of feed, the teeth 44 will engage the upper edge, or edges, of a blank or of a group of blanks, and cause them to be slightly separated one from the other, as shown in Figure 6. The separating action is obtained in this instance (but not necessarily in all instances) by applying a thrust to the upper edge of the blank or blanks and in a direction lengthwise of the blank. Inasmuch as, in this instance, the blanks slant downwardly and forwardly in direction of feed, and because of the relation of the feed wheel 32 to the belt 7 and retard means, the thrust of the wheel 43 is toward or into an angle formed by the periphery of the feed wheel 32 and a retard surface 55 of element 56. The application of thrust, in the manner mentioned, to blanks engaged in the throat causes them to buckle upwardly, and the forwardmost blank is pressed against the friction feeding surfaces of the feed wheel 32. Another ratchet wheel 45 is secured to the ratchet 43, and its teeth 46 are reversed relatively to the teeth of the wheel 43. A spring pawl 47 coacts with the teeth 46 to allow wheel 43 to rotate on the retraction stroke of the arm 24, but to prevent rotation during the forward stroke.

To adjust the wheel 43 in relation to the edges or to the end portions of the blanks or sheets, a thumb wheel 48 is mounted on a stud 49, which stud is threaded into a member 50, this member forming a part of the arm 40. An expansion spring 51 is interposed between the members 50 and 52, and holds portion 52 of the lever 41 against the setting wheel 48. As the eccentric members 28 and 29 reciprocate the member 26 and pawl arm 20, the ratchet wheel 17 is advanced by the pawl 35 to correspondingly obtain a forward motion of the wide canvas belt 7 and advance of the stacked supply of blanks, generally indicated at 53.

The feed wheel 32, see Figures 1 and 6, is provided with suitable friction means, in this instance with plugs 54 cooperable with the forward-most blank of those supported upon the retard friction surface 55, mounted in holder 56 which holder is secured to a cross-shaft 57, see Figures 1 and 5. The angular adjustment of this holder relative to the feed wheel 32 is controlled by a thumb wheel 58 having a stem rotatable in a casting 59, the stem being threaded into an arm 60 which is secured to the shaft 57. An expansion spring 61 is interposed between the members 59 and 60.

It is clear that when the arm 41 is raised, due to undue packing of the blanks, the pawl will be disengaged and the feed belt 7 will stop. The wheel 43, therefore, not only acts to buckle or separate the blanks, but constitutes a "feeler" movable as part of the means for stopping the blank supply advancing motion of the canvas belt 7, so that jamming at the throat or angle of contact between the feed wheel 32 and the retard member 55 will be prevented. This means is therefore adapted to regulate the rate of movement of the conveyor and the sheets thereon toward the feed wheel according to feeding requirements, and in this instance the means includes a "feeler" or "pilot" element controlled by variations in the packed condition of the sheets, for stopping or slowing the supply-advancing means when packing unduly increases and for starting or accelerating the advancing means when packing sufficiently decreases. Again it is to be understood that the movement of the belt 7 may be either continuous or intermittent.

Directly that the ratchet wheel 43 rises because of the unduly increased thickness or packed condition of the advancing blanks or sheets, the shaft 39 is rocked and in turn moves the finger 38 upwardly to release the pawl. This finger 38 is normally in inactive relationship with the pin 37 of the pawl 35, the parts being so arranged that shaft 39 may oscillate forwardly and rearwardly without causing arm 38 to trip the pawl. For this purpose, the upper surface of the finger 38 is straight so as to remain in close and constant contact with the pin, but so as not to raise it unless the shaft 39 is rocked as a result of upward motion of wheel 43, and arms 41 and 40. When the separating wheel 43 is caused to drop slightly, after such a rise, pawl 35 is again engaged.

The feeder 32 delivers the sheets to a sheet-advancing mechanism which includes a pulley 63 arranged adjacent and below the feed wheel 32, said pulley being mounted on shaft 64. The contact between the feed wheel and the pulley 63 serves to advance the blanks into a gluing and folding section, after the friction feed plugs 64 have engaged the blank and moved it between the friction feed wheel 32 and the retard member 55. The retard member permits the passage of only one blank at a time. The blank, after being forwarded by the feed wheel 32, is advanced by pins 66 of suitable chains 65, said pins engaging the rear of the blank. A suitable gear mounted on shafts 32 meshing with gear 68 on shaft 64, provides one form of driving connection between these shafts.

Figure 3:
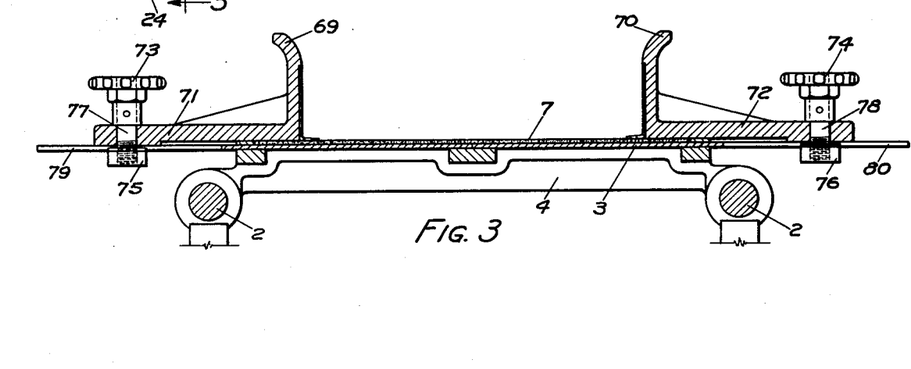
Figure 3 is a cross-section of the hopper on the line 3—3 of Figure 1.

Referring to Figures 1 and 3: Side guides 69 and 70 are provided with extensions 71 and 72. Mounted on the extensions are hand wheels 73—74. Each hand wheel 73 is secured to a threaded stud 77 and each hand wheel 74 is secured to a threaded stud 78. Studs 77 have nuts 75 and the studs 78 have nuts 76. These studs rotatably traverse the extensions 71—72 and slide in transverse slots 79—80 of plate 3. The purpose here is to adjust the side guide members 69 and 70 toward and away from each other to adapt the hopper for blanks of different sizes.

Figures 11, 12:
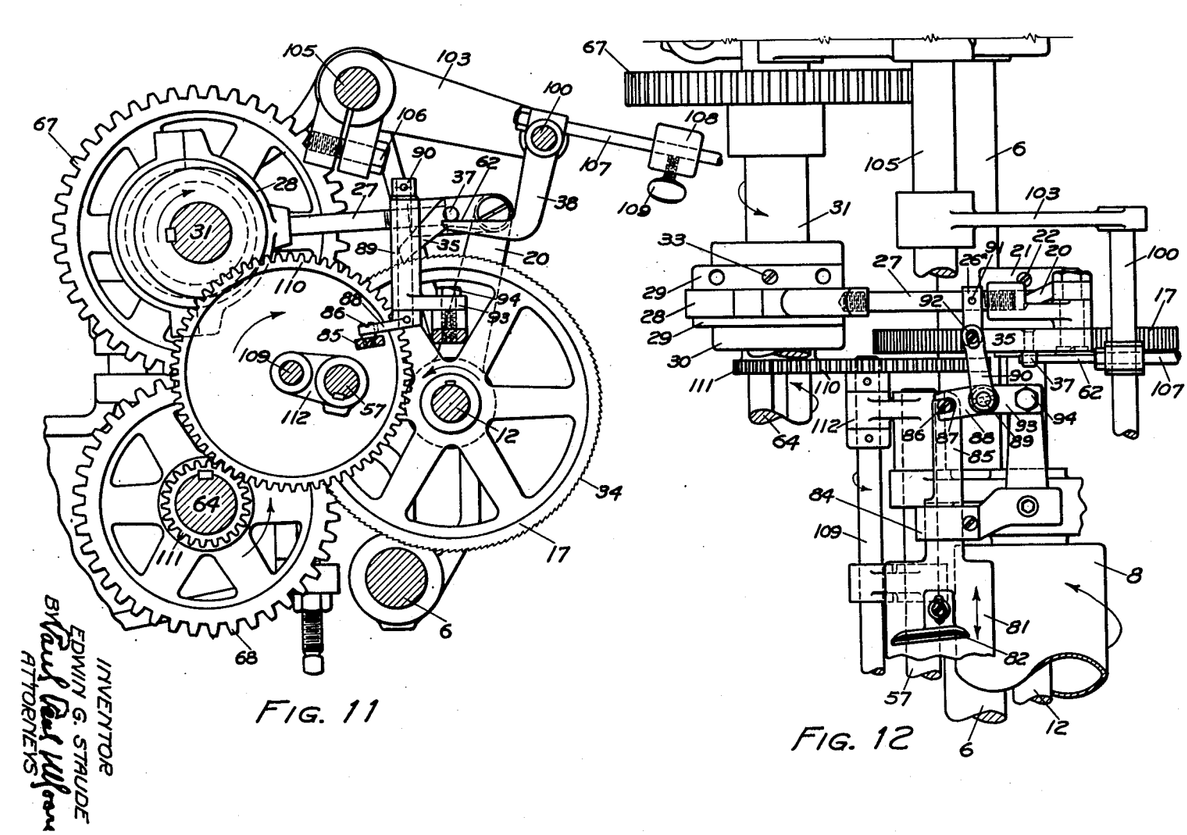
Figure 11 is a detail vertical longitudinal section on the line 11—11 of Figure 8.
Figure 12 is a detail plan view similar to Figure 8 showing the jogger in the opposite position or stroke.

In Figures 8 to 17, inclusive, there is shown a modification of the invention which includes a jogging mechanism in conjunction with a slowly revolving friction member coacting with the jogging mechanism, and having its friction surface moving in a direction opposite to the friction surface of the feed wheel at the feeding point. The jogger consists, see Figures 8 and 9, of a jogger plate 81 mounted for reciprocation in a direction transverse to the direction of feed of the blank or sheet. The jogger includes an angle member or abutment 82, adjustable lengthwise of the plate. The jogger plate 81 is mounted as at 83 and 84 in suitable guides stationarily attached to the frame, and the plate has an extension 85 having a threaded shouldered stud 86 engaged by a terminal slot or fork 87 of an arm 88 pivoted as at 89 (also see Figure 13). This arm 88 is reciprocated by an arm 90, connected to a short arm 26ª which is pinned to the connecting rod 27 as at 91. The arm 90 has a slotted connection as at 92 with a pin of the member 26ª. The pivot support for the pivot 89 is on a member 93 secured to the frame work as at 94 by a suitable cap screw. Figure 12 is a view similar to Figure 8 but with a jogger mechanism in its oppositely reciprocated position.

Figure 9:
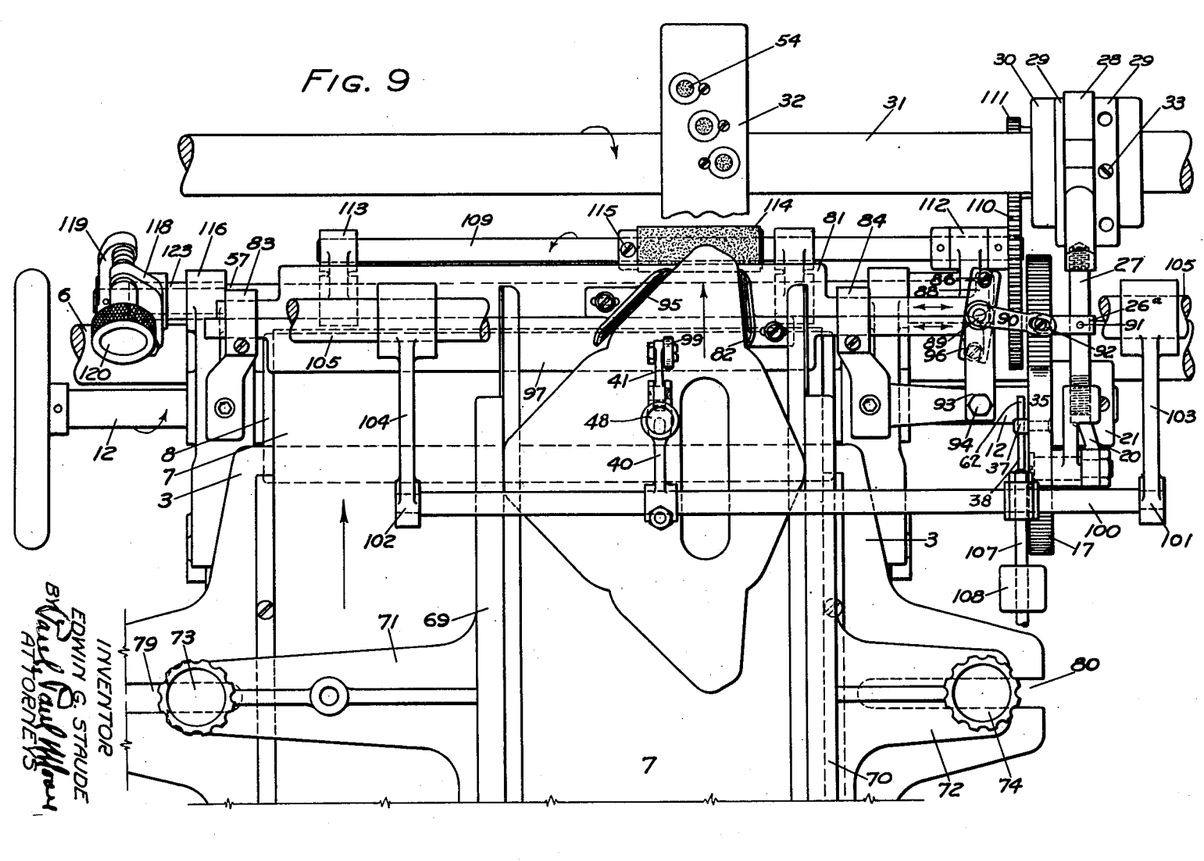
Figure 9 is a view similar to Figure 8, except that it shows a double jogging mechanism adapted to act on both sides of an irregular shaped blank.
Figure 13:
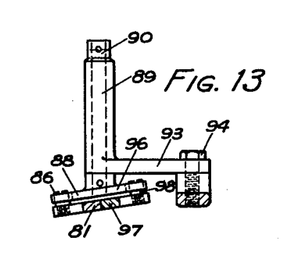
Figure 13 is a detail section of a part of the double jogger mechanism shown in Figure 9.

In Figures 9 and 13, two joggers are shown, the angle abutment 82 being mounted on one of the joggers and an angle abutment 95 being mounted on the other. The longitudinal edges of the jogger plates slide on one another. I have found that to make the jogger operate correctly, it is necessary to have the plates 81 move in opposite directions to cause the angle abutments to move toward or away from one another. This device acts to maintain a correct relation of a blank of the type shown in Figure 9, with the feed wheel 32. The device is used because the side edges of the type of envelope shown are short and therefore there is only a short area of contact with the side guides 69 and 70. It therefore frequently happens that the blanks do not always travel in a straight line, as do other types of blank which have long sides. I therefore make the jogger abutment elements 82 and 95 operate at opposite sides of the pointed end of the blanks, and in this instance make them form a forwardly convergent pocket into which the pointed end of the blank is delivered. The abutments can be angularly adjusted about their attaching screws, and slots permit variation in the transverse dimension. When, therefore, the blanks become skewed, during their advance toward the feeding wheel, their forward ends are caught and the blanks straightened by the jogger or joggers, before entry into the feeder.

Referring to Figure 9: In order to reciprocate the joggers in opposite directions, arm 88 is provided with an extension arm 96 which is terminally slotted to cooperate with a pin 98 on jogger plate 97, in the same manner as for the single jogger plate 81, see Figure 8. When using the double jogger, as shown in Figure 9, the angle abutment 82 is mounted on the jogger plate 97 and the angle jogger abutment 95 is mounted on the jogger plate 81.

Figure 10:
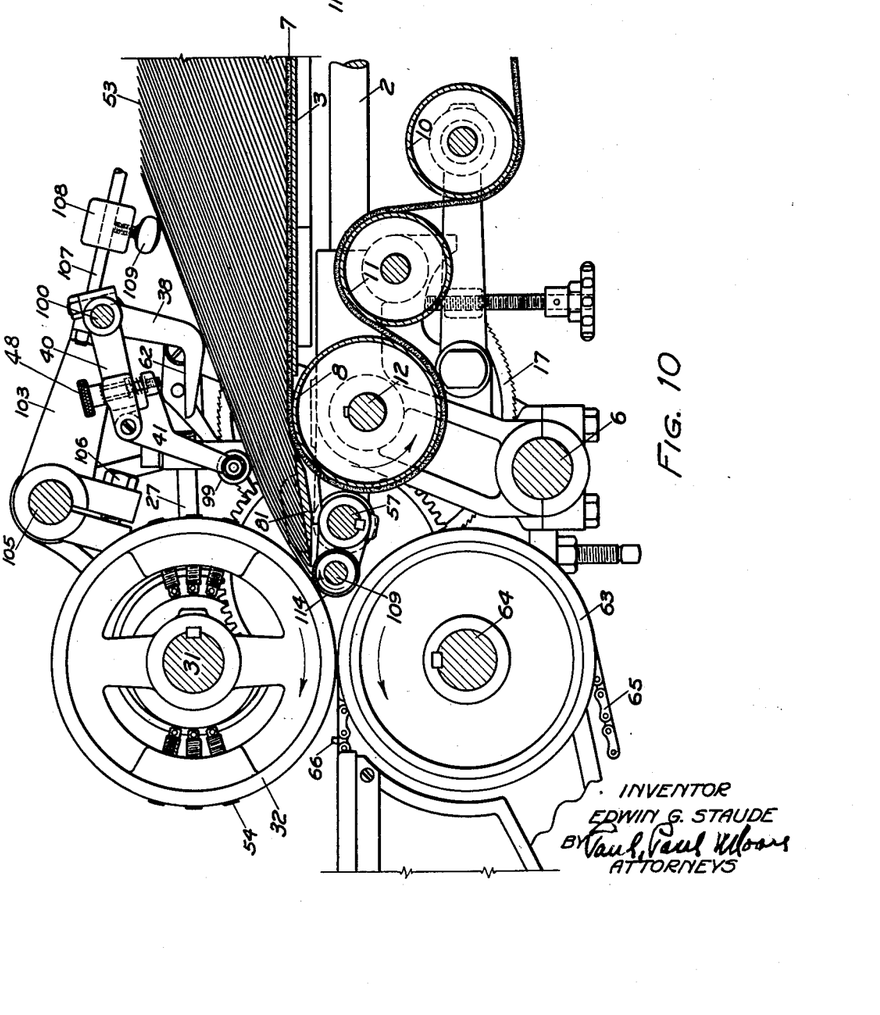
Figure 10 is a detail vertical longitudinal section on the line 10—10 of Figure 8.

On certain types of blanks, it is unnecessary to provide a ratchet wheel 43, or even to use such a wheel and I then merely use an arm to act as a "feeler", to regulate the advancing speed of the belt 7. Figure 10 shows a modification in which the reciprocating blank separating wheel 45 is dispensed with and instead there is provided an anti-friction roller 99 mounted on arm 41, in turn mounted on a rock shaft 100 held in suitable bearings 101—102 of arms 103—104, which arms are secured to the shaft 105 of the frame of the gluing and folding mechanism 6. These arms 103—104 are clamped to the shaft 105 by cap screws 106. A suitable rod 107 is secured to the shaft 100, the rod having a counter-weight 108 held in adjusted position by thumb screw 109. The purpose here is to counterbalance the weight of the arms 40—41 and the anti-friction wheel 99 to obtain a very sensitive control action so as not to retard the feeding of the blank any more than is positively necessary. I have found that some blanks, particularly "kraft" stock, adhere to one another to a greater extent that in the case of a smooth surfaced stock, and that when a stationary retard rubber such as 55 is used in conjunction with the feed wheel 32, as shown in Figure 6, the friction surfaces 54 will cause or permit more blanks to jam into the feeding angle than can be taken care of by the feeder and as the pressure of the blanks against one another increases or as they become more packed in the feeding angle, the friction between them increases to such an extent that the friction surfaces 54 are no longer capable of pulling out the uppermost blank. In such a case it is necessary for the operator to re-arrange the blanks, or reduce the number in the feed wheel contacting zone.

To overcome the above difficulty, I provide, see Figures 11 and 12, a shaft 109 driven by a gear 100 in mesh with gear 111 secured to shaft 64. The shaft 109 is mounted in brackets 112—113 (see Figure 9) which are keyed to the shaft 57. Mounted on the shaft 109 is a friction surface 114, secured to the shaft by a set screw 115. By the use of the construction just described, it is clear that the rock-shaft 57 can be adjustably rotated to move the shaft 109 and friction surface 114 toward or away from the feed wheel as required. The spacing here is sufficient to permit a blank to pass between the surfaces 54 and 114. Through the driving connection of the gears 110—111 the friction surface 114 is rotated in a direction opposite to that of the feed wheel 32 at point of feed. Because of this revolution in a direction opposite to travel of the blank, there is a tendency to hold the sheet back, and thus jamming of the sheets into the throat or feeding angle between the feed wheel 32 and the friction surface 114 is prevented.

Figures 14, 15:
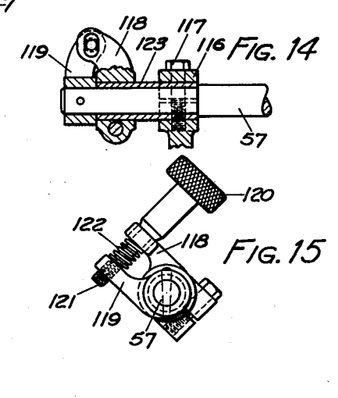
Figure 14 is a detail showing the manner of adjusting the revolving friction retard, which cooperates with the feed wheel.
Figure 15 is an end view of Figure 14.

I may adjust the rock-shaft 57 (shown in Figure 10) by a structure similar to that shown in Figure 5, but I may, and prefer in this instance to use the structures shown in Figures 14 and 15. In this construction, the rock-shaft 57 passes through a bearing 123 clamped to the frame 116 by a cap screw 117. Clamped to the bearing 123 is an arm 118 and pinned to the shaft 57 is an arm 119. A thumb wheel 120 has a portion 121 passing through the arm 118 and threaded into the member 119. A spring 122 presses the two members apart, and as the thumb wheel is adjusted in one direction, it moves the member 19 against the tension of the spring 122 and rocks the shaft 57 to bring the friction surface 114 toward the feed wheel 32.

Figure 16:
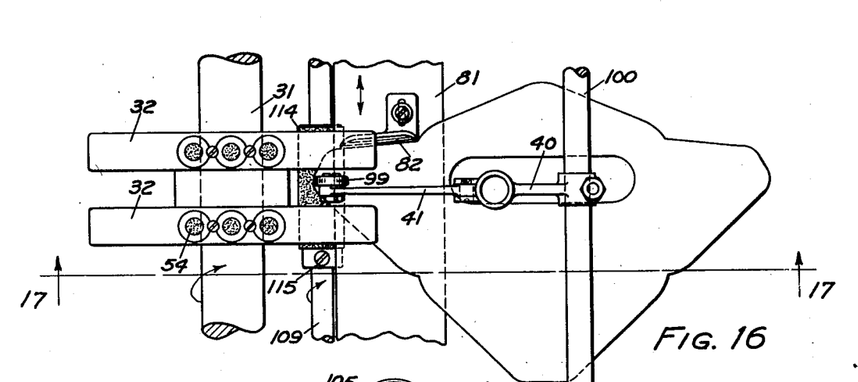
Figure 16 is a detail plan similar to that shown in Figure 8; except that the "feeler" or control lever which starts and stops the feed conveyor, contacts with the bottom or forward edge of the blank and is adapted to operate within the periphery of the feed wheel.
Figure 17:
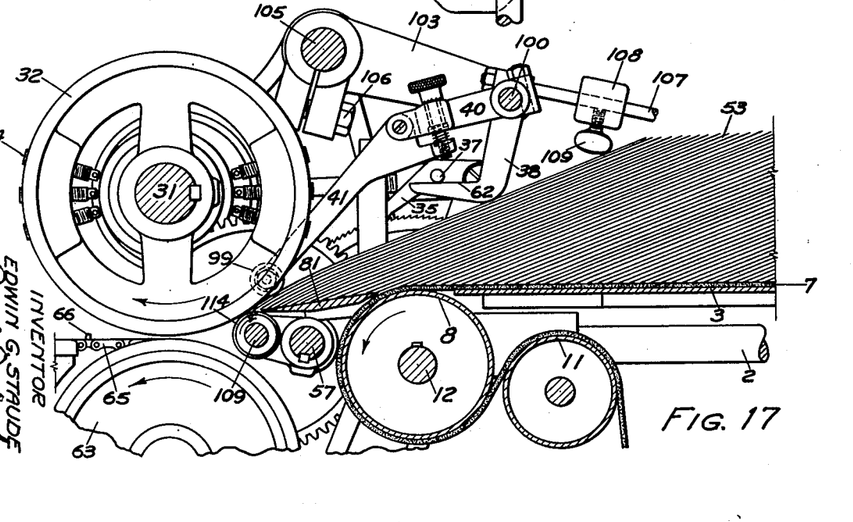
Figure 17 is a section on the line 17—17 of Figure 16.

In Figures 16 and 17 I have shown two feed wheels 32 spaced apart to provide room for the passage of the elongated arm 41 with its friction roller 99, to dispose the roller inwardly from the periphery of the feed wheel 32 so that it can act at a point nearer the cooperative feeding surfaces of the wheels 32, and the working surface of the retarding element. Either one feed wheel or two feed wheels can be used, provided that the arm 41 having the friction roller 99 just projects slightly inwardly beyond the periphery of the wheel 32, as shown in Figure 17, and close to the angle of contact so that all wedging of the blanks at this point is eliminated.

I have shown feeding plugs 54 on the periphery of the feed wheels 32, but do not intend to be limited to the use of this type of friction feeding, because in some instances, where timeless feeding is desirable, the working face of the feed wheel 32 may be covered with a rubber tire or other form of friction material similar to that used in the ordinary timeless top feeders in general use for feeding paper goods.

In Figure 1 there is shown in the hopper, the ordinary seed packet blanks. These blanks are usually lithographed in five colors and are therefore heavily covered with ink on the printed side and have considerable tendency to stick to one another. In practice, it has been found that by the use of the feeder of this invention, the adherent blanks are separated because of the action of the ratchet wheel 43, in the manner shown in Figure 6. The reciprocating motion of the ratchet wheel may vary from one-fourth to one-half an inch or more, depending upon the length of the blank and the amount and character of separation required.

I claim as my invention:

1. A sheet feeding mechanism, having a feeding wheel having a friction feeding surface, feed retard means in feeding relation with said feeding wheel, a moving conveyor for supplying sheets to the feeding wheel in overlapped relation, and means including a reciprocatory ratchet mechanism, including a part located near the end of the sheet to be fed and acting to loosen the sheet and adapted to start and stop said conveyor conformably to feeding requirement.

2. A sheet feeding mechanism, including a pair of co-acting feeding wheels, one of said wheels having a friction surface, adjustable feed retard means in feeding relation with said surface, including a surface which moves in a direction opposite to that of the feeding surface at the feeding point, a moving conveyor for supplying sheets to the feeding wheel, and speed controlling means including member adapted to swing within the circumference of said feeding wheel and bearing on sheets supported by the conveyor and adapted to start and stop said conveyor conformably to feeding requirements.

3. A sheet feeding mechanism, having a feeding wheel having a friction feeding surface, adjustable feed retard means in feeding relation with said surface, a moving conveyor for supplying sheets to the feeding wheel, means located near the periphery of the feed wheel and bearing on sheets supported by the conveyor, and adapted to start and stop said conveyor conformably to feeding requirements, said means being adapted to swing toward the periphery of the feed wheel to stop the conveyor.

4. A sheet feeding mechanism having a feeding wheel having a friction feeding surface, an adjustable feed retard means in feeding relation with said surface, a moving conveyor for supplying sheets to the feed wheel, means for separating the sheets, including a reciprocable arm having a uni-directional ratchet wheel, said wheel being adapted to bear on sheets supported by the conveyor, and be moved by the sheets to start and stop the conveyor to prevent jamming at the feeding wheel.

5. A sheet feeding mechanism, having sheet feeding means, means for bodily advancing a supply of sheets in forwardly and downwardly slanted and overlapped relations toward and into feeding relation with the feeding means, means in contact with and controlled by the packed condition of the supply of sheets for stopping the supply advancing means when packing unduly increases and for starting the advancing means when packing decreases, said last-mentioned means being adapted for forwardly thrusting action on the sheets in a manner to separate them one from the other.

6. A sheet feeding mechanism having a sheet feeding means, means for bodily advancing a stack of sheets toward and into feeding relation with the feeding means including lateral guides for the sheets, a jogger to which the sheets are delivered from said advancing means and adapted to reciprocate transversely of the sheets, a rotative retard device in feeding relation with the sheet feeding means and jogger and adapted to move in a direction opposite to that of the feeding direction of the sheet and of the feeding surface of the feeding wheel at the feeding point, and means for driving and controlling the aforementioned elements in a manner to perform their respective functions.

7. A sheet feeding mechanism including a pair of co-acting feeding wheels, one of said feeding wheels having feeding means, means for bodily advancing a stack of overlapped sheets horizontally toward and into feeding relation with the feeding means, a rotative retard device located beneath the advancing stack of sheets in feeding relation with the sheet feeding means and adapted to move in a direction opposite to that of the feeding direction of the sheet and of the feeding surfaces of the feeding wheels at the feeding point, and means for driving and controlling the aforementioned elements in a manner to perform their respective functions.

8. A sheet feeding mechanism having a sheet feeding means, means for bodily advancing a stack of sheets toward and into feeding relation with the feeding means including lateral guides for the sheets, a jogger to which the sheets are delivered from said advancing means and adapted to reciprocate transversely of the sheets, and means for driving and controlling the aforementioned elements in a manner to perform their respective functions.

9. A sheet feeding mechanism having a sheet feeding means, means for bodily advancing a stack of sheets toward and into feeding relation with the feeding means including lateral guides for the sheets, a jogger to which the sheets are delivered from said advancing means and adapted to reciprocate transversely of the sheets, a rotative retard device in feeding relation with the sheet feeding means and jogger and adapted to move in a direction opposite to that of the feeding direction of the sheet and of the feeding surface of the feeding wheel at the feeding point, an element controlled by the variations in the packed condition of the supply of sheets for varying the speed of the advancing means in a manner to prevent jamming of the sheets at the feeding point, and means for driving and controlling the aforementioned elements in a manner to perform their respective functions.

10. A sheet feeding mechanism having a sheet feeding means, means for bodily advancing a stack of sheets toward and into feeding relation with the feeding means including lateral guides for the sheets, a jogger to which the sheets are delivered from said advancing means and adapted to reciprocate transversely of the sheets, an element controlled by the variations in the packed condition of the supply of sheets for varying the speed of the advancing means in a manner to prevent jamming of the sheets at the feeding point, and means for driving and controlling the aforementioned elements in a manner to perform their respective functions.

11. A sheet feeding mechanism having a sheet feeding means, means for bodily advancing a stack of sheets toward and into feeding relation with the feeding means, a rotative retard device in feeding relation with the sheet feeding means and adapted to move in a direction opposite to that of the feeding direction of the sheet and of the feeding surface of the feeding wheel at the feeding point, an element controlled by the variations in the packed condition of the supply of sheets for varying the speed of the advancing means in a manner to prevent jamming of the sheets at the feeding point, and means for driving and controlling the aforementioned elements in a manner to perform their respective functions.

12. A sheet feeding mechanism, having a sheet feeding means, means for bodily advancing a stack of sheets toward and into feeding relation with the feeding means including a ratcheting mechanism driven in synchronism with the feeding means, and having a ratchet pawl, and means controlled by the variations in the packed condition of the supply of sheets for disengaging and engaging the pawl respectively when packing unduly increases and when packing sufficiently decreases.

13. A sheet feeding mechanism, having a sheet feeding means and shaft therefor, means for bodily intermittently advancing a stack of sheets toward and into feeding relation with the feeding means, in a manner to regulate the advancing speed to prevent jamming at the feeding point, including a ratcheting mechanism and means for driving it from said shaft.

14. A sheet feeding mechanism, having a sheet feeding means, means for bodily advancing a forwardly downwardly slanting stack of sheets toward and into feeding relation with the feeding means, a toothed wheel engageable with and movable by the forwardmost sheets of the stack for applying a forward thrust thereto, and means oscillatable by the wheel as it moves as a result of variations in the packed condition of the supply of sheets for regulating the speed of the advancing means to prevent jamming of the sheets at the feeding point.

15. A sheet feeding mechanism having a sheet feeding means, means for bodily advancing a forwardly downwardly slanting stack of sheets toward and into feeding relation with the feeding means, a toothed wheel engageable with and movable by the forwardmost sheets of the stack for separately buckling the sheets away from one another, and means oscillatable by the wheel as it moves as a result of variations in the packed condition of the supply of sheets for regulating the speed of the advancing means to prevent jamming of the sheets at the feeding point.

16. A sheet feeding mechanism having a feeding wheel having a friction surface, feed retard means below the feeding plane and in feeding relation with said feeding surface, a substantially horizontal conveyor for supplying sheets to the feeding wheel and retard means in overlapped relation and upon which the sheets flatly lie with the topmost sheet projecting forwardly of those beneath it and means including a part bearing on topmost sheet near the feeding wheel and adapted to regulate the rate of movement of the conveyor and sheets thereon toward the feed wheel conformably to feeding requirements.

17. A sheet feeding mechanism having a feeding wheel having a friction surface, feed retard means below the feeding plane and in feeding relation with said feeding surface, a substantially horizontal conveyor for supplying sheets to the feeding wheel and retard means, and means including a part bearing on the sheets supported by the conveyor and adapted to regulate the rate of movement of the conveyor and sheets thereon toward the feed wheel conformably to feeding requirements, said part bearing on the forwardmost part of the forwardmost sheet at a point above said feed retard means.

18. A sheet feeding mechanism having a feeding wheel acting on top of the fed material, feed retard means below the feeding plane and said feeding wheel, a conveyor for supplying sheets between the feeding wheel and feed retard means, and means adapted to start and stop the conveyor conformably to feeding requirements including a part located immediately laterally of the feed wheel above the feeding plane and immediately adjacent the feeding point and periphery of the feed wheel and bearing on a topmost sheet supported on the conveyor.

19. A sheet feeding mechanism including a rotary sheet feeding means, a conveyor for supporting a stack of sheets, means for intermittently advancing said conveyor and said stack of sheets towards said sheet feeding means, a control member operated by the variation in depth of said stack of sheets for starting and stopping the movement of said conveyor, said control member contacting said stack of sheets and being located near the periphery of said rotary sheet feeding means, said point of contact being adapted to swing within the circumference of said rotary sheet feeding means.

20. A sheet feeding mechanism including a pair of co-acting feeding wheels, one of said wheels having sheet feeding means, an oppositely rotating sheet retard member co-acting with said feeding means and between which and said means the sheet is fed, a conveyor for supporting a stack of sheets, means for intermittently advancing said conveyor and said stack of sheets towards said sheet feeding means, a control member operated by the variation in depth of said stack of sheets for starting and stopping the movement of said conveyor, said control member being located near the periphery of the wheel which has the sheet feeding means, and above said sheet retarding member.

21. A sheet feeding mechanism including a rotary sheet feeding means, a conveyor for supporting a stack of sheets, means for intermittently advancing said conveyor and said stack of sheets towards said sheet feeding means, a conveyor speed control member comprising a ratchet toothed wheel mounted on a reciprocating pivot and locked against rotation when moving in direction of the rotary sheet feeding means but free to revolve by frictional contact with said stack of sheets when moving away from said rotary sheet feeding means, said ratchet toothed wheel being adapted to bear on the stack of sheets and control the movement of said conveyor through the variation in depth of the stack of sheets.

22. A sheet feeding mechanism including a pair of co-acting feeding wheels, one of said wheels being provided with a friction feeding surface, means co-acting with said friction feeding surface for retarding said sheets when more than one sheet is being fed, a conveyor for supporting a stack of sheets, so that the topmost sheet slants downwardly and forwardly toward the meeting point of the wheels, a continuously operable reciprocating mechanism for advancing said conveyor to force the forwardmost end of the top sheet into contact with the wheels, including a conveyor movement control member for rendering said conveyor movement control mechanism active or inactive, said control member being responsive to variation in depth of said stack of sheets on said conveyor for causing movement to said conveyor, said control member being located above said retarding means.

23. A sheet feeding mechanism including a pair of co-acting revolving members, one of said members being provided with a friction surface adapted to contact a stack of blanks, a friction retard member co-acting with said friction surface, an intermittently operating endless conveyor belt supporting a stack of blanks for advancing said blanks against said friction surface on said revolving member, a ratchet wheel for driving said endless conveyor belt, a pivoted arm provided with a pawl for engaging said ratchet, driving means for said pivoted arm including an adjustable throw eccentric, a rock-shaft extending across the forward end of said endless conveyor belt, an arm adjustably secured to said rock-shaft, the forward end of said arm being adapted to bear upon the forward end of the stack of blanks on said endless conveyor belt and adapted to be actuated by the varying thickness of the stack of blanks on said endless conveyor belt, a second arm secured to said rock-shaft and having an operating connection with said pawl on said pivoted arm and adapted to raise said pawl out of contact with said ratchet upon the increase in thickness of said pile of blanks near the point where said blanks contact the said friction feeding surface.

24. A sheet feeding mechanism, comprising a support which moves substantially horizontally, said support having thereon a supply of superposed overlapped sheets which slant downwardly and forwardly and which are acute angularly related to the support, feeding means as sole means directly into feeding relation with which said support moves the supply, said feeding means acting only on the forwardmost part of the forward sheet of the supply, and feeding the same downwardly and between a retard member acting on the opposite side of the sheet.

25. A sheet feeding mechanism, comprising a substantially horizontally arranged feed belt supported at its forward end on and passing around a drum, and having thereon a supply of superposed overlapped sheets which slant downwardly and forwardly and which are acute-angularly related to the belt, feeding means near and forwardly of the drum toward and directly into feeding relation with which the belt bodily moves the supply, and feeding the same downwardly and between a retard member acting on the opposite side of the sheet.

26. A sheet feeding mechanism, comprising a substantially horizontally arranged feed belt supported at its forward end on and passing around a drum, and having thereon a supply of superposed overlapped sheets which slant downwardly and forwardly and which are acute-angularly related to the belt, a pair of feeding wheels spaced forwardly from the drum and belt, means arranged intermediately of said drum and belt upon and across which the sheets are bodily moved by the belt and serving to direct the topmost sheet into feeding relation with the feeding wheels.

27. A sheet feeding mechanism having, a feeding wheel, means arranged rearwardly of said wheel for bodily advancing a supply of superposed overlapped sheets into feeding relation with said wheel, the sheets of said supply being slanted forwardly and downwardly with the topmost sheet in advance of those beneath said feeding means acting only forwardly of said supply advancing means and on the forward end of the topmost sheet, and means arranged intermediately of said advancing means and said wheel for receiving and supporting the forwardmost portions of a plurality of said sheets after they leave said advancing means and acting to facilitate engagement of the uppermost sheet with said wheel.

28. A sheet feeding mechanism having a feeding wheel, means arranged rearwardly of said wheel for bodily advancing a supply of superposed overlapped sheets into feeding relation with said wheel, the sheets of said supply being slanted forwardly and downwardly with the topmost sheet in advance of those beneath, said feeding means acting only forwardly of said supply advancing means and on the forward end of the topmost sheet and slanting table to which said sheets are delivered and down which they slide on their way to said wheel.

29. A sheet feeding mechanism having, feeding means, means for bodily advancing a supply of superposed overlapped sheets directly into feeding relation with said feeding means, the sheets of said supply being slanted forwardly and downwardly with the topmost sheet in advance of those beneath said feeding means constituting the sole feeding means and only acting forwardly of said supply advancing means and upon the forward end of the topmost sheet.

30. A sheet feeding mechanism having a pair of co-acting feeding wheels between which the blanks are advanced, one of said feeding wheels being provided with a friction feeding surface, a retard member coacting with said friction feeding surface, a conveyor adapted to support and feed a stack of blanks by their edges contacting said conveyor, and means including a control member responsive to variation in depth of the stack of blanks for varying the advancing speed of the conveyor in a manner to prevent jamming of said blanks at the wheels.

EDWIN G. STAUDE.